Oct. 31, 1939.　　　H. A. ORR　　　2,178,431

PRETZEL MACHINE

Original Filed July 24, 1936

INVENTOR.
HARRY A. ORR
BY
Woodling and Krost.
ATTORNEY.

Patented Oct. 31, 1939

2,178,431

UNITED STATES PATENT OFFICE 2,178,431

PRETZEL MACHINE

Harry A. Orr, Cleveland, Ohio, assignor to The Victor Development and Patent Company Substituted for abandoned application Serial No. 92,382, July 24, 1936. This application October 2, 1937, Serial No. 167,060

9 Claims. (Cl. 107—14)

My invention relates to pretzel and other object forming machines and more particularly to a header and cutting knife for said machines. This application is a substitute of my abandoned application Serial No. 92,382, filed July 24, 1936.

An object of invention is to provide a machine for forming pretzels of proper shape and form.

Another object is to provide a machine for forming pretzels substantially round in a cross-section.

Another object is to provide a machine for forming pretzels and depositing them upon a conveyor without causing malformation of the pretzel.

A still further object is to provide a header for a pretzel machine, the said header having an opening through which the dough is extruded to form pretzels of proper shape and form.

A further object is to provide a header for a pretzel machine, which header has an opening in the shape of a pretzel and the walls of the opening being disposed to form pretzels of proper cross-sectional shape.

A further object is to provide a header for a pretzel machine, which properly forms the pretzel without packing the dough or killing the "life" of the dough.

A still further object is to provide a header for a pretzel machine with an opening extending through the die plate of the header, the bore of the opening being such that the dough is forced through a restricted part of the opening and the restriction reduced so that the dough is permitted to partially expand before being severed from the header.

A further object is to provide a knife member for severing the dough after being extruded through the header, the said knife member being so shaped and disposed as to aid in the forming of the pretzel with the proper cross-sectional shape.

A still further object is to provide a knife member for severing the dough, the said knife member being so disposed and directed in movement so as to aid in the proper shaping of the pretzel and to aid in the depositing of the severed pretzel upon a conveyor without malformation.

Still another object is to provide a header and a knife for a pretzel machine, the header and knife so co-acting as to form and deposit pretzels of proper shape and contour.

Other objects and a fuller understanding may be had by referring to the following description and claims taken in conjunction with the drawing, in which:

Figure 1:
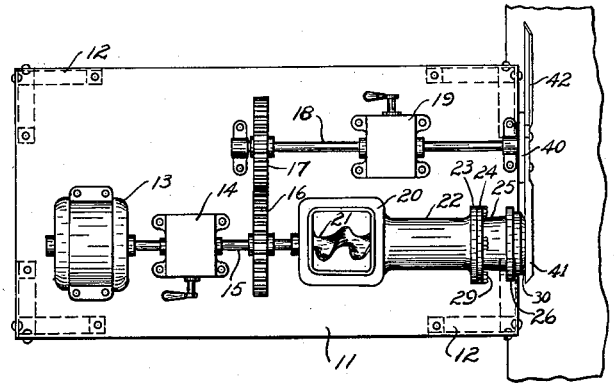
Figure 1 is a plan view of my pretzel machine.

Referring to Figure 1, I show my pretzel machine mounted upon a table top 11, which in turn is supported upon the support 12. The motor 13 driving the shaft 15 through the variable speed transmission 14 turns the screw propeller 21 within the housing 22 of the pretzel machine. The screw propeller 21 is seen through the top of the hopper 20 of the housing 22. The housing 22 has a flange 23 extending from its open end, and snugly engaging the flange 23 is the flange 24 of my header 25, which flanges 23 and 24 are joined by means of the bolts 29 extending through the openings provided therein. The header may be easily attached and detached by engagement of the bolts 29. The openings 55 are slotted to form widened holes having an elliptical cross-section, thus permitting adjustment of the position of the header. It is necessary to have the header turned to a proper position, and the form of the openings 55 facilitates this rotative adjustment. The sweep of the knife should be substantially perpendicular to the pretzel so that the two upper nodes of the pretzel are cut off simultaneously and so the pretzel does not fall in a heap. If one node is cut off first, the dough last cut holds on and the first part cut swings over onto the last cut side. Therefore, by means of this rotative adjustment of the header, the knife member will be in proper position relative to the pretzel being extruded through the header so that both sides of the pretzel are cut off at once. By turning the header and fastening in position, the dough is extruded and disposed at a proper angle and is properly positioned in relation to the knife member.

The side walls of the header extend back a substantial distance so that the header has a substantial volume in advance of the screw propeller 21, thus allowing the turbulence of the dough caused by the screw propeller to subside before being extruded. The header 25 has a forward flange 26 around its periphery.

The gear 16 mounted on the shaft 15 is enmeshed with the gear 17 which in turn rotates the shaft 18. Power through the shaft 18 drives the knife wheel 40 which is regulated in speed by the variable speed transmission 19. The knife members 41 and 42 are secured to the knife wheel 40 by means of rivets or bolts or in other suitable manner as is better illustrated in Figure 2.

Figures 2, 3, 4:
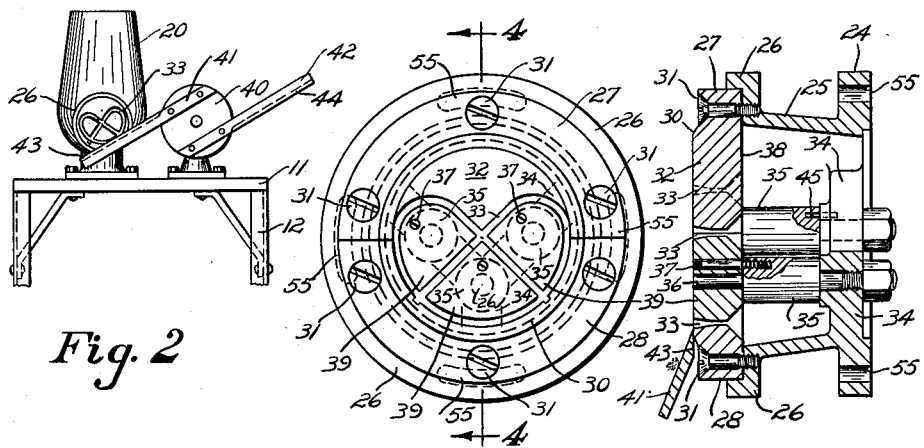
Figure 2 is a right-hand end view of the pretzel machine shown in Figure 1.
Figure 3 is a detailed view of my header as viewed from the forward face.
Figure 4 is a cross-sectional view taken through the line 4—4 of Figure 3.

As the knife members 41 and 42 meet the face of the header 25 at an inclined angle, they are mounted to the knife wheel 40 at the required angle to the axis of the knife wheel 40. The upper edge of the knife member 41 as is shown in Figure 2 is tilted towards the header and the lower edge of the knife member 42 is tilted toward the header, so that both knife members 41 and 42 meet the face of the header inclined at the proper angle. The knife member 41 is beveled along its inside upper edge as shown by the reference character 43 so as to form a sharp knife edge along its upper edge, and so that the inside beveled surface 43 of the knife member 41 comes in close contact with the forward face 32 of the header. The knife member 42 is similarly beveled at 44 to form a knife edge and which beveled portion 44 on the knife member 42 so-act with the header in the same manner as the beveled portion 43 of the knife member 41.

Detail of the construction of my header is shown in Figures 3 and 4, Figure 3 being a view looking at the face of the header and Figure 4 being a cross-sectional view taken through the line 4—4 of Figure 3. The header is constructed of the header wall member 25 which has a flange 24 with holes extending therethrough for the securement of the bolts 29 in fastening the header to the housing 22. As shown by dotted lines in Figure 3, the Y-shaped support member 34 is made integral with the header wall member 25 and extends across the rearward end, which in Figure 4 is the right-hand side of the header.

Offset pins 45 extend inwardly from the Y-shaped support member 34 and protrude into small holes provided in the rear end of each bolt 35. The pins 45 assist in preventing the bolts 35 from rotatably moving in respect to member 34 as the pins are set off center of the bolts 35.

Secured to the forward flange 26 of the header wall member 25 is the upper die plate section 27 and the lower die plate section 28 which are secured in place by means of the screw bolts 31. The assembled die plate section members 27 and 28 are provided with an opening in the shape of the outer outline of a pretzel. Within this opening are mounted the three segmental island pieces 29 so set from the edges of the opening in the die plate sections 27 and 28 as to form between themselves and between the edges of the die plates sections 27 and 28 an opening or orifice 33 which extends in the shape of a pretzel.

The segmental island pieces 39 are held in position by means of the bolts 35 extending longitudinally of the header back through the openings provided in the Y-shaped supporting bracket 34 and secured thereto by nuts threadably engaged to the bolts 35. The segmental island pieces 29 are provided with openings through which the extending portions 36 of the bolts 35 extend. The extending portions 36 snugly engage within the openings of the segmental island pieces 39 and firmly hold them in position. To prevent any possible turning of the segmental island pieces 39 upon the extending portions 36, I provide screw bolts 37 which protrudes through the segmental island pieces 39 into the bolts 35, thus preventing any rotation of the segmental island pieces and also aiding in securely holding the segmental island pieces 39 to their respective bolts 35, each segmental island piece 39 being mounted upon a separate bolt 35.

The forward end of the wall member at 26 is provided with a recessed shoulder. The section plates 27 and 28 snugly fit into the recess and engage the recessed shoulder as shown. This construction holds the section plates 27 and 28 in proper alignment and proper position.

The dough being extruded passes from the right to the left in the header shown in Figure 4 and therefore, I have called the inner wall of the assembled die plate as the rearward face 38 and have designated the outer side as the forward face 32, both the forward face 32 and the rearward face 38 designating the flat portion of the assembled die plate members composed of the upper section 27, the lower section 28 and the segmental island pieces 39. It is to be noted that the rearward face 38 has a relatively expansive flat surface against which a relatively large volume of dough abuts. The orifice in the die plate is small and covers a relatively small space on the rearward face 38. There being a relatively large volume in the rear of the die plate and the rearward face being extruded across this large volume a large and steady flow of dough is fed into the orifice without restricting the volume or packing the dough.

The forward face 32 is provided with a beveled shoulder 30 around its periphery, which beveled shoulder 30 aids in providing a close contact between the knife member 41 and the forward face 32 as the knife member 41 and the knife member 42 are somewhat resilient and moving upwardly slide across the header to meet the beveled portion 30 and thence upwardly in close contact with the forward face 32. By means of the resilient knife members and this beveled portion 30, a close shearing action between the forward face 32 and the knife members is always obtained and the knife members are always brought into proper alignment.

The opening or orifice 33 shaped in the outline of a pretzel has variably disposed sides so that the bore of the orifice 33 varies as it extends through from the rearward face 38 to the forward face 32, of the die plate member. The die plate member is relatively thick and about three times as thick as that ordinarily used for a die plate member for dough or other plastic material. I prefer a die plate member which is three-fourths of an inch from the forward face 32 to the rearward face 38 as it provides ample space for the proper manipulation of the dough without unduly compressing the dough so as to kill the "life" of the dough.

Figures 5, 6, 7:
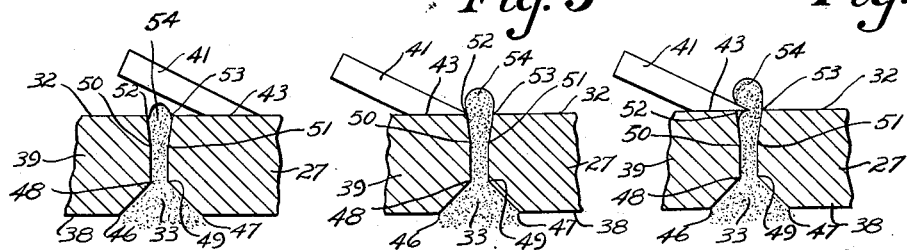
Figure 5 is a detailed view in cross-section of the opening or orifice of my header with the knife member in one position.
Figure 6 is a view similar to that shown in Figure 5 with the knife member in another position.
Figure 7 is a view similar to Figures 5 and 6 with the knife member in still another position.

Figures 5, 6, and 7 illustrate a cross-sectional view of the die plate member and particularly show a cut through and across the orifice 33. The knife member 41 in moving upwardly across the forward face 32 of the header is shown in Figures 5, 6, and 7 as moving to the right. The sides or walls of the orifice 33 are so disposed that beginning at points 46 and 47, they converge towards each other at a 45 degree angle from a line running perpendicular to the rearward face 38 until the sides or walls reach point 48 and 49 which is one-third of the distance between the rearward face 38 and the forward face 32.

From points 48 and 49, the walls or sides extend substantially parallel to each other and substantially perpendicular to the rearward walls 38 and there form the most restricted portions of the orifice, 33. At points 50 and 51, the sides or walls are again inclined and are extended away from each other so as to lie at an 8 degree angle from a line drawn perpendicular to the forward face 32 and extend at that angle until reaching the forward face 32. The restricted portion between points 48 and 49 and points 50 and 51 extend approximately one-third of the thickness of the die plate member and thus the remaining one-third part of the sides disposed at the said 8 degree angle extend for the remaining one-third of said thickness.

The dough 54, being propelled by the screw propeller 21, is forced against the rearward face 38 of the die plate member and thus forced into the orifice 33. The dough used in making pretzels and similar objects is plastic and has a certain "life", it being leavened and expandable by reason of the yeast and other ingredients. One of the chief obstacles in forming objects of leavened dough by extrusion means has been that the act of forcing the dough through restricted openings has tended to flatten and to kill the dough so that the dough lost its leavened characteristic after being extruded through the restricted opening. The nature of the die plate member on my header and the nature of the orifices therein is such that the dough retains its leavened characteristic after being extruded.

The dough 54 is pressed against the rearward face 38 and is directed into the orifice 33 by reason of the force in propelling the dough forward. The size of the orifice 33 extending at a 45 degree angle from points 46 and 47 to points 48 and 49 gradually compress the leavened dough somewhat to give it form and direct it through the restricted portion of the orifice 33 extending between points 48 and 49 and points 50 and 51, which restricted opening shapes the pretzel dough in proper form for a limited distance, being just enough to properly form the dough without unduly pressing it. The size of the orifice 33 extending at its 8 degree angle between points 50 and 51 and points 52 and 53 permit a gradual and partial release of the restriction and compression of the dough so that after the dough has been compressed just enough to give it form, it is permitted to partially expand before reaching the forward face 32 and yet keeping it within limits so as to maintain the proper shape. This gradual compression of the dough by the sides extending at a 45 degree angle and restricting it for a limited distance and again permitting it to expand by reason of the outwardly sloping walls, which walls are at an incline less than the incline through which the dough was first compressed, aid in producing a formed pretzel or other object in the required outline and form but which has not been deadened or flattened in texture.

The 8 degree inclined sides in permitting some expansion within the die member but limiting that expansion by reason of the small incline of the sides retains some of the dough's expansibility so that after the dough is extruded, the remaining expansibility causes the extruded dough to swell and round out thus aiding in the forming of a well rounded pretzel. This swelling of the dough continues after the dough is severed thus completing the rounding out effect along the severed side.

The incline of the sides of the orifice 33 and more particularly the sides inclined at an 8 degree angle adjacent the forward face also act in conjunction with the knife 41 to form a pretzel having a substantially round cross-section. Pretzels and similar objects formed from dies from extruding dough through die members not possessing the characteristics of my invention have been square or rectangle in cross-section rather than round as is required in making a properly shaped pretzel. However, through the use of my die member and knife, the dough is extruded and severed to form pretzels having a round and regular cross-section.

Referring to Figure 5, the knife member in moving upwardly, has moved to the right in the view illustrated in this figure. The knife member 41 has just sheared off a formed pretzel, and the beveled portion 43 of the knife member 41 has just passed from over the orifice 35 permitting the dough 54 to extrude through the orifice 33. The action of the knife member 41 in moving to the right causes the extruding dough 54 to stick for a short period of time to the edge of the orifice 33 at point 53 and the extruding dough 54 is pulled slightly away from point 52 by reason of the shearing action to the right of the knife member 41. As the extruding dough 54 sticks at point 53 for a moment or two, the dough 54 being forcefully extruded in swelled out and pushed or rolled out of the orifice along the side of the orifice adjacent the point 52. This temporary sticking of the dough at point 53 on the right side of the orifice as shown in Figure 5 and the swelling or rolling expansion along the left side of the orifice causes the dough to be extruded to form a round surface.

As seen in Figure 5, the left side of the extruded dough is raised slightly higher than the dough on the right side adjacent to point 53. However, as illustrated in Figure 6, after sufficient of the dough has been extruded, this tends to round out to form a well rounded extruded portion of dough so that when the knife member 41 is again raised upwardly across the face of the header, and comes to the position shown in Figure 6, the extruded dough has taken on a well rounded appearance. The leavened condition of the pretzel dough retaining its live and expansible characteristic after being extruded aids in giving a rounded contour to the extruded dough.

In Figure 7, the knife has moved upwardly across the face of the header which is to the right in Figure 7, so that the knife member 41 has partially sheared off the extruded dough 54. It is seen that the inclined angle of the knife member 41 is such that the maintenance of the rounded contour of the extruded dough is assured. The beveled portion 33 cleanly shears off the extruded dough while the inclined side of the knife member 41 cuts into the extruded dough at an angle, and slightly rolls it due to the direction of the knife member and the tenacity of the dough in such a way that the extruded dough 54 after being completely severed presents a well rounded form. The inclination of the sides of the orifice adjacent the forward face 32 also aids in this rolling action in that the extruded dough is permitted to be rolled somewhat further by the action of the knife member 41 before being completely severed at point 53. Without this inclination, the rolling effect could not be as complete and the cutting into the round form would not be as full. Therefore, the nature of the orifice of my header gives a new characteristic to the extruded dough coming out of the orifice, the disposition, shape and direction of my knife member gives a new severing and shaping action and the cooperation of the header and knife member results in forming pretzels of proper shape and contour.

The disposition of my knife members at an inclined angle to the forward face 32 of my header and the upward direction of the knife member moving across the forward face of the header is such that the pretzels sheared off are retained in their proper outline and shape and are not deformed and crushed. The inclined knife member in upward direction also gives the severed pretzel a flip so that the severed pretzels fall upon the conveyor or receptacle in a substantially horizontal position with the first extruded surface underneath. The applicant's upwardly moving knife sliding closely across the face of the header severs the extruded dough in a way that the uppermost portion of the pretzel is sheared off last. Until this uppermost portion is sheared off, the pretzel is held in proper position at the oepning in the header. Upon the severing of the uppermost portion and the upward passing of the body of the knife blade between the severed uppermost portion and the header, the formed pretzel is tilted, that is, the top of the pretzel is inclined over so that the pretzel in perfect form falls on a substantially horizontal plane upon the conveyor. The upward "flip" of the knife blade thus gives a unique and novel result in maintaining the shape of the pretzel and in "flipping" the formed pretzel so as to fall horizontally.

A downwardly moving knife cutting the top portion of the pretzel first also has a tendency to crumple up the extruded dough. The force of gravity upon the extruded dough is constant and as the extruded dough is severed from the unextruded dough, it tends to fall. The downward movement of the body of the knife is thus similar in direction to the force of gravity upon the dough. The contacting of the body of the downwardly moving knife with the severed dough tends to aid the downward fall of the severed dough to distort and disform the shape of the pretzel.

The downward movement of a knife also possesses the characteristic of "throwing" the severed pretzel down against the conveyor upon the edge of the pretzel, or as it may be expressed, sending the pretzel into a "nose dive". The applicant has cured this serious trouble by his invention, which by its new mode of operation, eliminates this downward "throw".

The inclined knife member and upward direction thus prevents the severed pretzel from being thrown down on its edge, but by its flipping action severs the pretzel without malformation and deposits it in proper shape.

Figure 8:
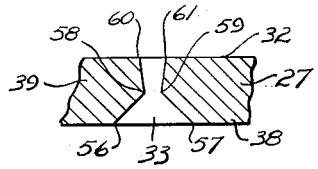
Figure 8 illustrates a modified form of an opening or orifice in my header.

Figure 8 is a modified form of the orifice and die plate member. In this modification, the die plate member is only two-thirds as thick as the die plate members in Figures 5, 6, and 7, and the point of maximum restriction is confined at points 58 and 59, rather than continued for a distance. The walls of the orifice 33 are disposed at an incline of 45 degrees and extend from points 56 and 57 to points 58 and 59 where the bore of the orifice is at its smallest amount. From points 58 and 59, the walls or sides of the orifice extend outwardly at an incline which is an 8 degree angle from the perpendicular to the forward space 32. It is seen that the modification in Figure 8 is similar to the preferred form shown in Figures 5, 6, and 7, with the exception that the central restricted portion of the orifice wherein the walls continue parallel for a short distance is omitted. The action of the dough coming through the orifice of the modification in Figure 8, and the co-action of the knife member with the die plate member is similar to that explained in the preferred form.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

It is to be understood that I am not limiting the scope of my invention by specifying the 8 degree and 45 degree angle of the sides of the orifice, nor to sides of angular disposition. Other angles and disposition of the sides may be resorted to for meeting certain conditions and requirements without departing from the spirit and the scope of my invention.

The invention herein described and claimed is also not to be construed as being limited to the making of pretzels as other objects may be made by the utilization of the invention. The cross-sectional shape of the objects is not to be considered as limited to only those having a substantially circular circumference but also those having a "rounded" shape as elliptical or the like.

I claim as my invention:

1. In a machine for forming open pretzels by the extrusion of plastic expansible dough through a restricted opening to form a protrusion in the shape of a pretzel suspended from said opening and by the shearing off of the extruded dough by a knife member to form pretzels, of an extrusion die plate having a forward face at which the dough is sheared off and having a flat rearward face at which the dough is fed, said die plate having an opening in the shape of a channel extending through the die plate from one face to the other face, said channel being disposed in the shape of a pretzel to be formed, the said channel having sides which beginning at said rearward face extend toward each other, thence extend substantially parallel to each other to form a restricted opening, and thence extend away from each other to the forward face, at an angle in the neighborhood of eight degrees the distance between said sides at the forward face being less than the distance between said sides at the rearward face so that the dough passing through said channel from the rearward face to the forward face is compressed by said sides to pass through said restricted opening and is partially released from said restrictions to form a protrusion in the shape of a pretzel of live and expanding dough suspended from said opening at said forward face.

2. In a machine for forming open pretzels by the extrusion of plastic and expansible dough through a restricted orifice to form a protrusion in the shape of a pretzel suspended from said orifice and by the severing of the extruded dough by a knife member to form pretzels, said machine having a housing, the said housing having a passageway through which the said dough is advanced, of a flat die plate adapted to be mounted to said machine transversely of the said passageway to block the passageway so that the said dough advanced through the passageway is forced against the said flat die plate, the said flat die plate having a rearward face against which said dough is forced and having a forward face at which said dough is severed, said die plate having an orifice in the shape of a channel extending through the die plate from one face to the other face, said channel being disposed in the shape of a pretzel, the said channel having a variable bore, the bore at a point intermediate the two said faces being smaller than the bore at the two said faces and the bore at the forward face being smaller than the bore at the rearward face so that the walls of said channel compress said dough as it enters said channel and permit partial expansion of said dough as it is extruded from the rearward face to the forward face through the said channel, the compression and the expansion of said dough being such that a protrusion of a well defined shape is suspended from said orifice at the said forward face, the bore beginning at the forward face sloping inwardly toward the intermediate point at an angle in the neighborhood of eight degrees.

3. In a machine for forming open pretzels by the extrusion of plastic and expansible dough through a restricted orifice to form a protrusion in the shape of a pretzel suspended from said orifice and by the severing of the extruded dough by a knife member to form pretzels, said machine having a housing, the said housing having a passageway through which the said dough is advanced, of a flat die plate adapted to be mounted to said machine transversely of the said passageway to block the passageway so that the said dough advanced through the passageway is forced against the said flat die plate, the said flat die plate having a rearward face against which said dough is forced and having a forward face at which said dough is sheared off, said die plate having an orifice in the shape of a channel extending through the die plate from one face to the other face, said channel being disposed in the shape of a pretzel, the said channel having a variable bore converging inwardly from the forward face at a slight angle, the bore at the forward face being greater than the bore of the channel rearwardly of said forward face, so that the dough extruded through said channel is permitted to partially expand before being sheared off at the said forward face, the expansion of said dough being such that a protrusion of dough of a live and unpacked character and in the shape of a pretzel is suspended at said orifice to be sheared off from the said die plates.

4. In a machine for forming open pretzels by the extrusion of plastic and expansible dough through a restricted orifice to form a protrusion in the shape of a pretzel suspended from said orifice and by the severing of the extruded dough by a knife member to form pretzels, said machine having a housing, the said housing having a passageway through which the said dough is advanced, of a flat die plate adapted to be mounted to said machine transversely of the said passageway to block the passageway so that the said dough advanced through the passageway is forced against the said flat die plate, the said flat die plate having a rearward face against which said dough is forced and having a forward face at which said dough is sheared off, said die plate having an orifice in the shape of a channel extending through the die plate from one face to the other face, said channel being disposed in the shape of a pretzel, the said orifice having sides sloping outwardly toward said forward face at an angle in the neighborhood of eight degrees to permit partial expansion of said dough before being extruded out of said orifice, so that the said dough develops into a rounded protrusion suspended from said orifice.

5. In a machine for forming open pretzels by the extrusion of plastic and expansible dough through a restricted orifice to form a protrusion in the shape of a pretzel suspended from said orifice and by the severing of the extruded dough by a knife member to form pretzels, said machine having a housing, the said housing having a passageway through which the said dough is advanced, of a flat die plate adapted to be mounted to said machine transversely of the said passageway to block the passageway so that the said dough advanced through the passageway is forced against the said flat die plate, the said flat plate having a forward face at which said dough is severed, the said opening having sloping walls extending inwardly and rearwardly from said forward face at an angle in the neighborhood of eight degrees so that said dough is less restricted as it moves toward the said forward face permitting a limited lateral movement at said forward face as the extruded dough is severed.

6. In a machine for forming open pretzels by the extrusion of plastic and expansible dough through a restricted orifice to form a protrusion in the shape of a pretzel suspended from said orifice and by the shearing off of the extruded dough to form pretzels, of an extrusion die plate having a flat rearward face against which said dough is forced and having a forward face at which said dough is sheared off, said die plate having an orifice in the shape of a channel extending through the die plate from one face to the other face, the die plate adjacent said orifice providing an obstacle to forward movement of said dough, said channel being disposed in the shape of a pretzel, the said orifice having inwardly sloping sides to direct said dough forward and to compress said dough into the proper shape and having outwardly sloping sides of approximately eight degrees to permit partial expansion of said dough before being extruded through said orifice, the said partial expansion aiding in the development of a protrusion of dough in the shape of a pretzel at said forward face.

7. In a machine for forming open pretzels by the extrusion of plastic expansible dough through a die member and the severing of the extruded dough by a knife member passing across and parallel to the forward face of the header, of a header for said machine, said header having a flat plate portion at its forward end, said plate portion having a forward and a rearward face and having a restricted opening, said opening having a relatively small area at said rearward face so that the rearward face blocks said dough, extending from the rearward to forward face, in the shape of the outline of a pretzel through which said dough is extruded, said opening having sides which extend from said forward face in a gradual and positive slope in the neighborhood of eight degrees inwardly of said plate portion, the bore of the opening being greater at said forward face than inwardly of the said plate portion, so that said dough is permitted to partially expand as it is being extruded, the arrangement of the said sides being such that the extruded dough protruding from the said opening is inclined toward one of said sides as the said knife member passes across the said forward face.

8. In a machine for forming open pretzels by the extrusion of plastic expansible dough through a restricted opening to form a protrusion in the shape of a pretzel suspended from said opening and by the shearing off of the extruded dough by a knife member to form pretzels, of an extrusion die plate having a forward face at which the dough is sheared off and having a flat rearward face at which the dough is fed, said die plate having an opening in the shape of a channel extending through the die plate from one face to the other face, said channel being disposed in the shape of a pretzel to be formed, the said channel having sides which beginning at said rearward face extend toward each other for a distance approximately one-third the thickness of the die plate at an angle in the neighborhood of forty-five degrees, thence extend substantially parallel to each other for a distance approximately one-third the thickness of the die plate to form a restricted opening, and thence extend away from each other to the forward face at an angle in the neighborhood of eight degrees, the distance between said sides at the forward face being less than the distance between said sides at the rearward face so that the dough passing through said channel from the rearward face to the forward face is compressed by said sides to pass through said restricted opening and is partially released from said restrictions to form a protrusion in the shape of a pretzel of live and expanding dough suspended from said opening at said forward face.

9. In a machine for forming open pretzels by the extrusion of plastic and expansible dough through a restricted orifice to form a protrusion in the shape of a pretzel suspended from said orifice and by the severing of the extruded dough by a knife member to form pretzels, said machine having a housing, the said housing having a passageway through which the said dough is advanced, of a flat die plate adapted to be mounted to said machine transversely of the said passageway to block the passageway so that the said dough advanced through the passageway is forced against the said flat die plate, the said flat die plate having a rearward face against which said dough is forced and having a forward face at which said dough is sheared off, said die plate having an orifice in the shape of a channel extending through the die plate from one face to the other face, said channel being disposed in the shape of a pretzel, the said orifice having sides sloping outwardly toward said forward face for a distance of approximately one-quarter of an inch and at an angle in the neighborhood of eight degrees to permit partial expansion of said dough before being extruded out of said orifice, so that the said dough develops into a rounded protrusion suspended from said orifice.

HARRY A. ORR.